(12) United States Patent
Kim et al.

(10) Patent No.: US 9,142,820 B2
(45) Date of Patent: Sep. 22, 2015

(54) LITHIUM SECONDARY BATTERY CELL STRUCTURE

(71) Applicant: Hyundai Motor Company, Seoul (KR)

(72) Inventors: Tae-Young Kim, Gyeonggi-do (KR); Hee-Yeon Ryu, Gyeonggi-do (KR); Sam-Ick Son, Gyeonggi-do (KR); Ju-Young Sung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 91 days.

(21) Appl. No.: 13/923,840

(22) Filed: Jun. 21, 2013

(65) Prior Publication Data

US 2014/0186678 A1 Jul. 3, 2014

(30) Foreign Application Priority Data

Dec. 27, 2012 (KR) ........................ 10-2012-0154051

(51) Int. Cl.
*H01M 2/16* (2006.01)
*H01M 10/0562* (2010.01)
*H01M 10/0525* (2010.01)

(52) U.S. Cl.
CPC ........ *H01M 2/1686* (2013.01); *H01M 10/0562* (2013.01); *H01M 10/0525* (2013.01); *Y02E 30/122* (2013.01)

(58) Field of Classification Search
None
See application file for complete search history.

(56) References Cited

FOREIGN PATENT DOCUMENTS

| JP | 2008103146 A | 5/2008 |
|---|---|---|
| JP | 2011054457 A | 3/2011 |
| KR | 10-2009-0027144 A | 3/2009 |

OTHER PUBLICATIONS

U.S. Appl. No. 13/676,487, filed Nov. 2012, Visco et al.*

* cited by examiner

*Primary Examiner* — Patrick Ryan
*Assistant Examiner* — Christopher Domone
(74) *Attorney, Agent, or Firm* — Mintz Levin Cohn Ferris Glovsky and Popeo, P.C.

(57) ABSTRACT

A lithium secondary battery that has a battery cell structure, with improved electrochemical stability between an electrode and an electrolyte. In addition, the lithium secondary battery improves ion conductivity while applying a solid electrolyte. More specifically, a lithium secondary battery comprising a separator formed by an electrolyte between the cathode and the anode, wherein a composite coated layer of lithium-lanthanum-titanate ($Li_xLa_yTiO_3$) and lithium-lanthanum-zirconium-oxide ($Li_7La_3Zr_2O_{12}$) is formed on the interface of the anode and the electrolyte.

9 Claims, 5 Drawing Sheets

LITHIUM SECONDARY BATTERY CELL STRUCTURE

CROSS-REFERENCE TO RELATED APPLICATION

This application claims priority under 35 U.S.C. §119 to Korean Patent Application No. 10-2012-0154051, filed on Dec. 27, 2012, in the Korean Intellectual Property Office, the disclosure of which is incorporated herein by reference in its entirety.

BACKGROUND (a) Technical Field

The present invention relates to, in a lithium secondary battery, a battery cell structure, which has electrochemical stability between an electrode and an electrolyte, and improves ion conductivity while applying a solid electrolyte.

(b) Background Art

Generally, Lithium Ion Batteries have been applied to portable information technology (IT) electrical devices and small electronic devices due to their high energy density per unit weight and their easiness of design. And recently, the batteries have been developed in larger sizes and applied as a power source for electric cars and a power source for storage of electric power according to development of alternative energy sources.

Among the lithium ion batteries, the lithium secondary battery is composed of the cathode and the anode, an electrolyte and a separator, and when discharging, oxidation occurs by deintercalation of lithium ions in the anode and reduction occurs by intercalation of the lithium ions in the cathode. Further, when charging, oxidation occurs by deintercalation of the lithium ions in the cathode and reduction occurs by intercalation of the lithium ions in the anode. Furthermore, the electrolyte does not show conductivity to electrons but only shows ionic conductivity, and is configured to transfer the lithium ions between the cathode and the anode.

In the lithium secondary battery, the lithium ion intercalated into the electrode becomes a medium storing electrical energy in the electrode by forming charge neutralization with electrons coming into the electrode. Accordingly, the amount of the ion intercalated into the electrode to form the charge neutralization controls the amount of the electrical energy, that can be stored in the battery. Basic performances of the lithium secondary battery such as operating voltage and energy density are determined by the materials making the cathode and the anode, but to obtain increased battery performances, the electrolyte intercalated between the anode and the cathode should have increased ionic conductivity, electrochemical stability, thermal stability and the like. In consideration of the reduction with the anode and the oxidation with the cathode, the electrolyte should be electrochemically stable in the corresponding electric potential range.

In the past, lithium salts and organic solvents were mainly used as components of the electrolyte, but when using the said liquid electrolytes, the risk of battery explosion under high temperature and high voltage circumstances increased. Accordingly, a solution applying a solid electrolyte instead of the conventional liquid electrolyte has been developed, but when applying the solid electrolyte, the battery was electrochemically instable and the electrical conductivity of the lithium ion decreased.

The description provided above as a related art of the present invention is just for helping understanding the background of the present invention and should not be construed as being included in the related art known by those skilled in the art.

SUMMARY

The present invention provides a lithium secondary battery that improves chemical stability and lithium ion conductivity when contacted with the lithium (Li) based metal using a core-shell structure added with the lithium-lanthanum-zirconium-oxide (LLZ) or the composite powder structure.

Further, the present invention provides a lithium secondary battery using the lithium-lanthanum-titanate (LLT) based solid electrolyte, which may be used to develop a high energy density battery, may manufacture a battery with various electrode materials due to the chemical stability achieved by the substantially low reactivity with the electrode interface, and may reduce risk of explosion of the battery by the liquid electrolyte.

Objects of the present invention are not limited to the aforementioned objects, and other non-described objects of the invention will become apparent to those skilled in the art form the following description.

Furthermore, the present invention provides a lithium secondary battery comprising a separator formed by an electrolyte between the cathode and the anode, wherein a composite coated layer of LLT ($Li_xLa_yTiO_3$) and LLZ ($Li_7La_3Zr_2O_{12}$) is formed on the interface of the anode and the electrolyte. In addition, the "x" and "y" in the LLT ($Li_xLa_yTiO_3$) may be about 0.30-0.40 and about 0.50-0.60, respectively. For example, the LLT ($Li_xLa_yTiO_3$) may be formed in the range of 0.300.40 and $0.50 \leq y \leq 0.60$, for example, $Li_{0.33}La_{0.56}TiO_3$ or $Li_{0.36}La_{0.55}TiO_3$.

Furthermore, the LLT/LLZ composite may be formed as a core shell structure, in which the LLT becomes a core and the LLZ becomes a shell. In addition, the LLT/LLZ composite may be formed as a structure, in which the LLT becomes a core and the LLZ is adhered to the LLT core in the form of powder. Furthermore, the diameter of the LLT may be about 10 to 1000 nm, and the thickness of the LLZ may be about 1 to 100 nm. Additionally, the thickness of the LLT/LLZ composite coated layer may be about 0.1 to 1.2 μm.

The LLT/LLZ composite may be formed by any one method selected from a CVD (Chemical Vapor Deposition) method, a PVD (Physical Vapor Deposition) method, a temperature difference growth method, a composite powdering method or a RF (radio frequency) sputtering method. In addition, the electrolyte may be formed as a LLT based solid electrolyte and the solid electrolyte may comprise a LLT/LLZ composite.

Furthermore, the cathode may use a sulfur (S) electrode or a carbon(C) electrode, and the anode may be an electrode formed by any one active material selected from Li, $LiCoO_2$, $LiNiO_2$, $LiNiCoO_2$, $LiMn_2O_4$, $V_2O_5$ or $V_6O_{13}$.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
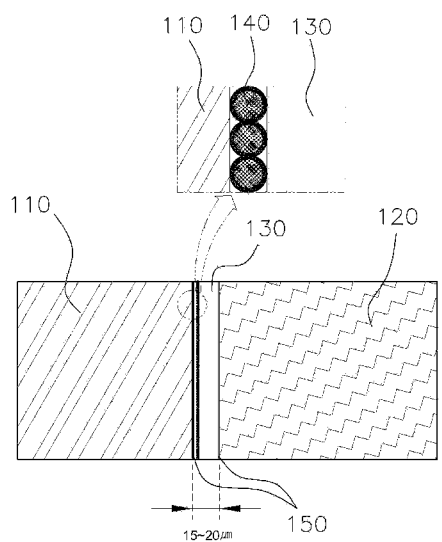
FIG. 1 is an exemplary diagram of the lithium secondary battery according to an exemplary embodiment of the present invention.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings. The terms and the words used in the specification and claims should not be construed with common or dictionary meanings, but construed as meanings and conception coinciding the spirit of the invention based on a principle that the inventors can appropriately define the concept of the terms to explain the invention in the optimum method. Therefore, embodiments described in the specification and the configurations shown in the drawings are not more than the exemplary embodiments of the present invention and do not fully cover the spirit of the present invention. Accordingly, it should be understood that there may be various equivalents and modifications that can replace those when this application is filed.

The present invention relates to an all-solid-state battery structure applying a LLT/LLZ composite solid electrolyte, and the all-solid-state battery, wherein the liquid electrolyte used for the existing lithium secondary battery is replaced with the solid electrolyte, may reduce the risk ignition and explosion by degradation of an electrolytic solution and the like. Accordingly, stability of the battery may improve.

The all-solid-state battery may use a Li metal or a Li-alloy as an electrode material, and thus, energy density may be improved compared to the weight and the volume of the battery. However, generally, the solid electrolyte may have lower ionic conductivity than the liquid electrolyte or poor electrode/electrolyte interface contact, or the physical properties of the solid electrolyte may change due to the reactivity. Accordingly, deterioration of the battery performance may occur. Therefore, the solid electrolyte contacted to the lithium electrode should have substantially high ionic conductivity but substantially low electronic conductivity, and should have increased chemical stability when interfacial contact with the lithium occurs to secure the battery performance. Accordingly, the present invention provides a battery structure that applies a composite electrolyte, which uses the characteristics of LLT ($Li_xLa_yTiO_3$) and LLZ ($Li_7La_3Zr_2O_{12}$).

FIG. 1 is an exemplary diagram of the lithium secondary battery according to an exemplary embodiment of the present invention. In the lithium secondary battery comprising a separator 150 formed by an electrolyte 130 between the cathode 120 and the anode 110, the lithium secondary battery of the present invention may contain a composite coated layer 140 of LLT ($Li_xLa_yTiO_3$) and LLZ ($Li_7La_3Zr_2O_{12}$) on the interface of the anode 110 and the electrolyte 130.

The cathode 120 may be formed with a sulfur (S) electrode or a carbon (C) electrode, but not limited thereto, and may be formed with any material, which may be used as the cathode of the existing lithium secondary battery. The anode 110 may be formed with any one material selected from a group consisting of: Li, $LiCoO_2$, $LiNiO_2$, $LiNiCoO_2$, $LiMn_2O_4$, $V_2O_5$ or $V_6O_{13}$, and may be formed with any material of lithium-based metals or lithium-based alloys. The LLT ($Li_xLa_yTiO_3$)/LLZ ($Li_7La_3Zr_2O_{12}$) composite coated layer 140 may be formed on the interface of the anode 110 and the electrolyte 130. Specifically, the LLT ($Li_xLa_yTiO_3$) may be formed in the range of $0.30 \leq x \leq 0.40$ and $0.50 \leq y \leq 0.60$, for example, $Li_{0.33}La_{0.56}TiO_3$ or $Li_{0.36}La_{0.55}TiO_3$. The LLT/LLZ composite coated layer 140 may be formed to improve conductivity of a lithium ion and to maintain chemical stability of the anode 110 and the electrolyte 130.

In other words, the LLT ($Li_xLa_yTiO_3$), which is a type of oxide solid electrolyte, is advantageous in terms of ion conductivity because the conductivity of the Li ion may be as high as the liquid electrolyte ion conductivity, but since there is substantially low contact stability with the Li metal, Li ions may move to the solid electrolyte when directly contacted to the Li metal. Accordingly, the chemical structure of the LLT may change due to an increase of electronic conductivity. Comparably, the LLZ ($Li_7La_3Zr_2O_{12}$) may have substantially poor conductivity due to having lower ion conductivity than the LLT, but may not react with the Li metal when contacted thereto, and may be substantially chemically stable.

Therefore, in the present invention, to compensate the electrochemical instability of the LLT, stability with the Li metal may be improved, and furthermore, battery capacity may be improved, by adding the LLZ to the LLT as a composite. In particular, the LLT/LLZ composite may be formed in the form of a core-shell structure, in which the LLT becomes a core and the LLZ becomes a shell, or in the form of composite powder, in which the LLT becomes a core and the LLZ is adhered to the LLT core in the form of powder.

The LLT/LLZ composite structure as described above may be formed by any one method selected from a group consisting of: a CVD (Chemical Vapor Deposition) method, a PVD (Physical Vapor Deposition) method, a temperature difference growth method, a composite powdering method and a RF sputtering method, and this will be described later.

In the present invention, the diameter of the LLT may be about 10 to 1000 nm, and the thickness of the LLZ may be about 1 to 100 nm, and therefore, the thickness of the LLT/LLZ composite coated layer 140 may be about 0.1 to 1.2 μm. However, the diameter of the LLT, the thickness of the LLZ and the thickness of the composite coated layer are not limited thereto, and the size may be controlled according to the need of the invention.

The electrolyte 130 may be formed with the LLT-based solid electrolyte, and in the present invention, the solid electrolyte may be formed with the LLT/LLZ composite. However, in the present invention, since the LLT/LLZ composite coated layer 140 may be formed on the interface of the anode, the known solid electrolytes containing lithium (Li) atom, phosphorus (P) atom and sulfur (S) atom may be used as the electrolyte other than the LLT/LLZ composite.

Figure 2:
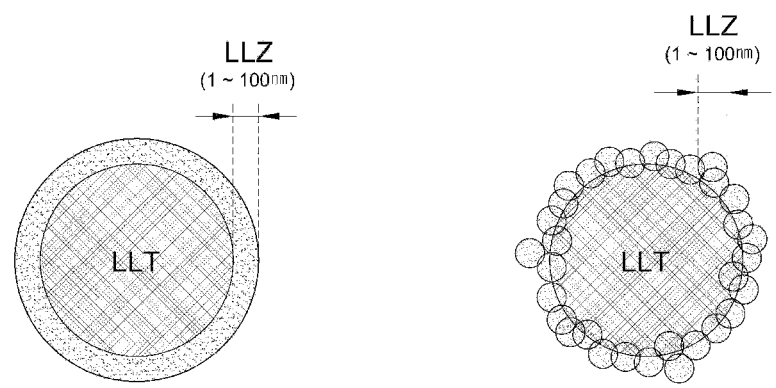
FIG. 2 is an exemplary cross-sectional drawing of the LLT/LLZ composite according to an exemplary embodiment of the present invention.

FIG. 2 is an exemplary cross-sectional drawing of the LLT/LLZ composite according to an exemplary embodiment of the present invention.

In the present invention, a battery may be manufactured using a composite, wherein the LLZ is thinly coated on the LLT using the LLT and the LLZ materials prepared beforehand. In particular, since the LLT is substantially high in the conductivity of the lithium ion, a double composite structure, wherein the LLT part is broadly formed and the LLZ surrounds the LLT in the form of a substantially thin coated layer, may be required (see Table 1). As mentioned above, in the LLT/LLZ composite 140, the LLT becomes a core, and the LLT becomes a shell or powdered to coat the LLT core.

In the present invention, the LLT as a core may be a particle in the size of about 10 nm~10 μm, and the LLZ may be a shell having the thickness of about 1 nm~100 nm or powder having the diameter of about 1 nm~100 nm. However, the LLZ coated on the LLT core may be a material contributing to the chemical reaction stability characteristic. Accordingly, as the thickness or diameter decreases, the chemical reaction stability characteristic increases since the characteristic of the LLT may exhibit increased ionic conductivity due to lower ionic conductivity of the LLT when the LLT/LLZ composite is used as the solid electrolyte.

The following Table 1 is a table comparing electrochemical properties of the LLT and the LLZ.

TABLE 1

| | LLT | LLZ |
|---|---|---|
| Advantage | High ionic conductivity (similar level with liquid electrolyte, $\sigma_g = \sim 10^{-3}$) | Good stability with electrode material such as Li metal various materials can be used when applied to battery No difference between G.B ionic conductivity and grain conductivity easy to control structure |
| Disadvantage | Instable when contacted to Li metal Lower G.B conductivity than grain, and dominantly affects to total ionic conductivity there is difficulty on controlling G.B of material | Low ionic conductivity ($\sigma_g = 1.6 \times \sim 10^{-6}$, $\sigma_{gb} = 5.6 \times 10^{-7}$) |

In the above Table 1, $\sigma_g$ represents the ionic conductivity, and $\sigma_{gb}$ represents G.B (Grain Boundary) ionic conductivity.

As known by observing the electrochemical properties of the LLT and the LLZ in the Table 1, when applying the composite structure having the surface coated layer of the LLZ on the LLT core as the solid electrolyte, the interface with the lithium electrode may be stably maintained due to the chemical reaction stability of the LLZ, and the ionic conductivity may be substantially similar to the ionic conductivity of the liquid electrolyte since the conduction of the lithium ion may occur by the LLT. Accordingly, a battery may be manufactured with various electrode materials due to the increased stability achieved due to substantially low reactivity with the electrode interface, and further, a battery having substantially high energy density may be manufactured since the Li ionic conductivity may be as high as the LLT level.

Figure 3:
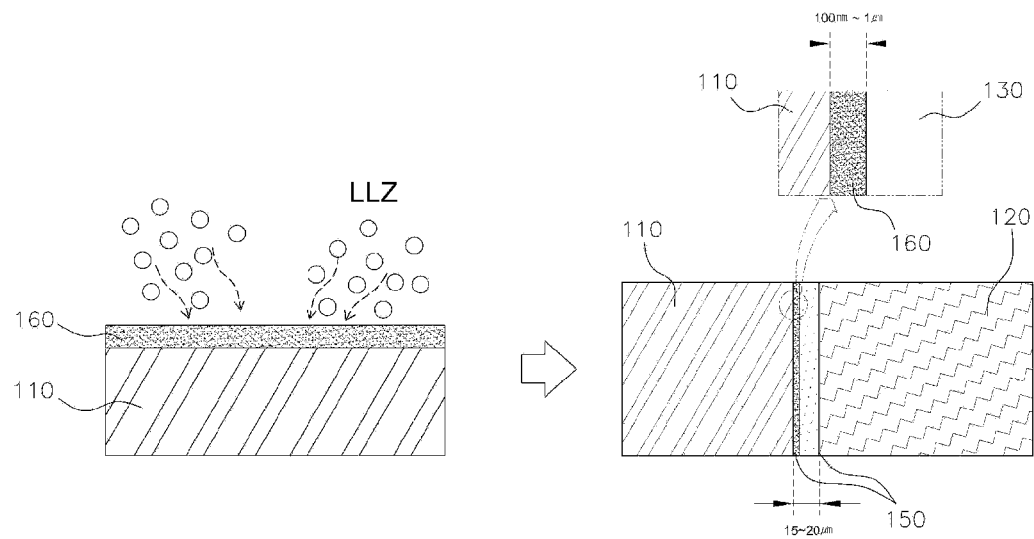
FIGS. 3 and 4 are exemplary drawings showing a process manufacturing the lithium secondary battery by forming the LLT/LLZ composite coated layer according to an exemplary embodiment of the present invention.
Figure 4:
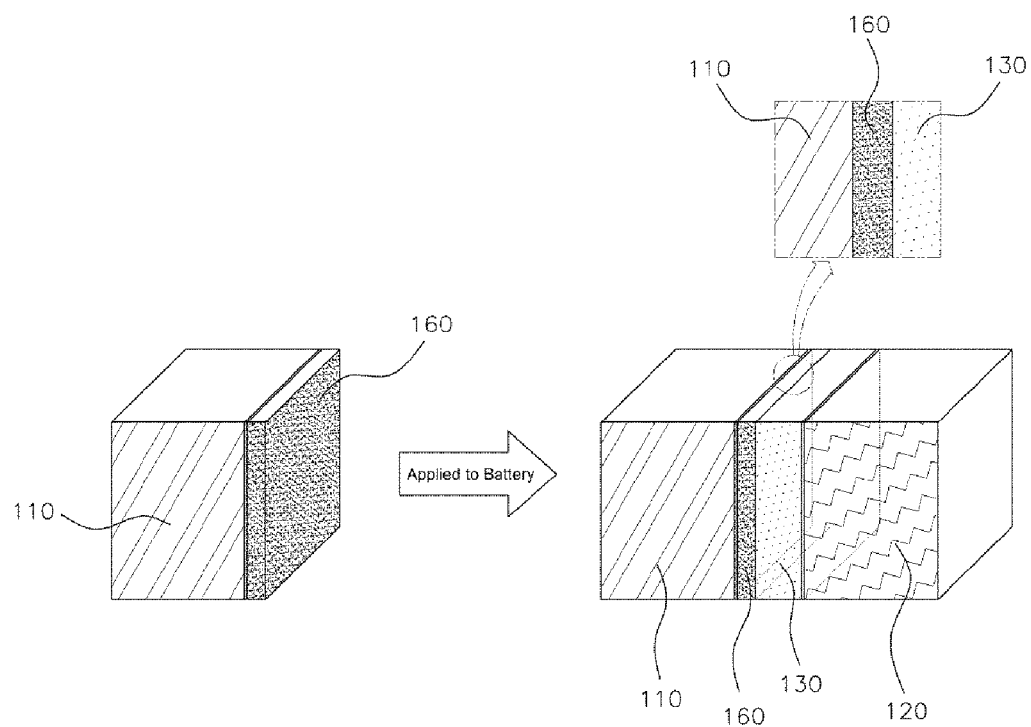

FIGS. 3 and 4 are exemplary drawings showing a process manufacturing the lithium secondary battery by forming the LLT/LLZ composite coated layer according to an exemplary embodiment of the present invention. Specifically, FIGS. 3 and 4 illustrate methods of manufacturing the battery by forming the LLZ coated layer 160 on the interface of the anode 110 having a thickness of about 100 nm~1 μm, filling the remaining electrolyte 130 with the solid electrolyte having substantially high conductivity of the lithium ion such as the LLT or stacking up the solid electrolyte by coating a layer thicker than the LLZ layer, and combining a cathode material.

The LLZ coated layer 160 may be formed using a CVD method, a PVD method or a sputtering method and the like, and the LLT/LLZ composite coated layer may be formed on the anode interface by adding the LLT on the LLZ coated layer 160. On the other hand, after the LLT/LLZ composite coated layer is formed in a predetermined amount, the electrolyte 130 may be formed by adding known electrolytes containing a lithium (Li) atom, a phosphorous (P) atom and a sulfur (S) atom.

Figure 5:
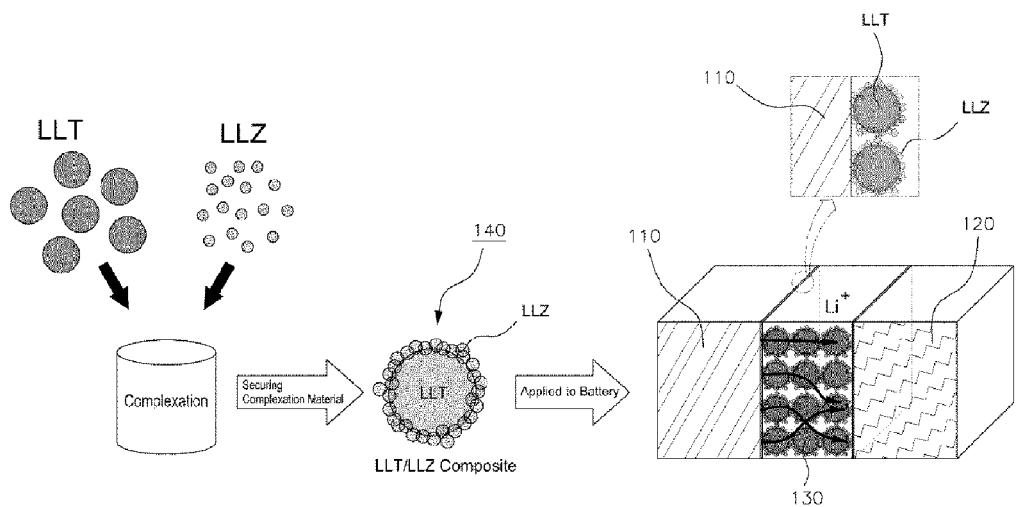
FIG. 5 is an exemplary drawing showing the lithium secondary battery comprising the LLT/LLZ composite electrolyte according to an exemplary embodiment of the present invention.

FIG. 5 is an exemplary drawing showing the lithium secondary battery comprising the LLT/LLZ composite electrolyte according to an exemplary embodiment of the present invention.

As mentioned above, according to the method for using the LLT/LLZ composite powder, wherein the composite is applied to a battery as the electrolyte 130, a battery may be manufactured with the interface contacting to the anode 110 with the composite powder, and the LLT or other electrolyte having substantially high ionic conductivity may be applied in the middle; or may be constructed by applying the LLT/LLZ composite powder to the entire electrolyte 130 part.

In other words, the electrochemical stability and the ionic conductivity of the level of the liquid electrolyte may be obtained by applying the LLZ, which is a substantially stable material having no reactivity, to the electrode interface to prevent reaction with the anode 110; and by applying a material having substantially high lithium ion conductivity such as the LLT on the electrolyte 130 part except the electrode surface.

FIGS. 6 to 9 are exemplary drawings showing a method for forming the LLT/LLZ composite according to an exemplary embodiment of the present invention. The LLT/LLZ composite 140 may be formed by any one method selected from a group consisting of: CVD (Chemical Vapor Deposition) method, a PVD (Physical Vapor Deposition) method, a temperature difference growth method, a composite powdering method, and a RF sputtering method.

Figure 6:
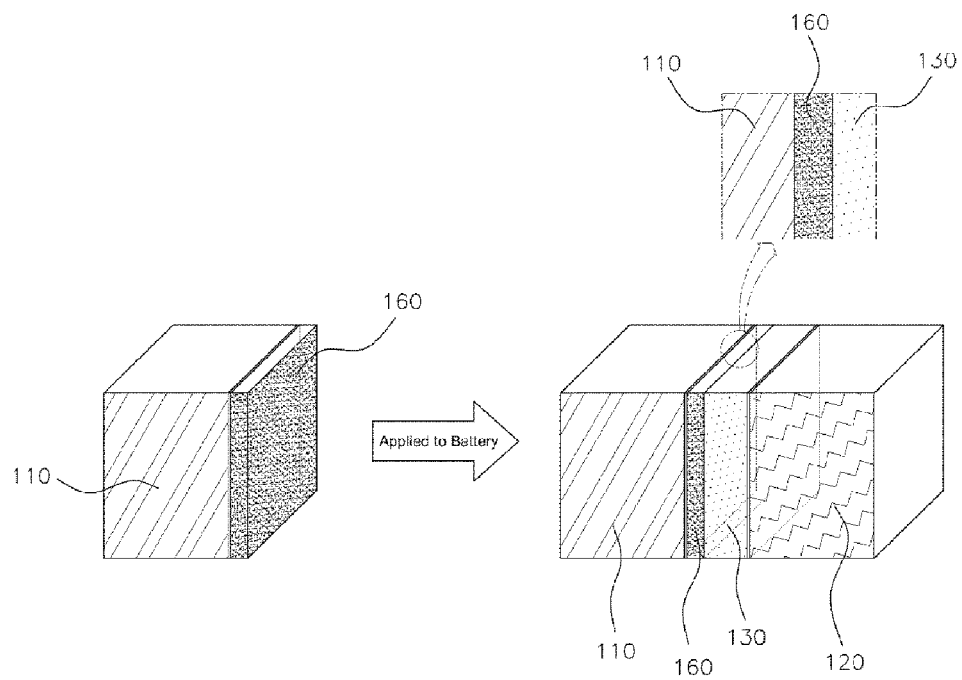
FIGS. 6 to 9 are exemplary drawings showing a method for forming the LLT/LLZ composite according to an exemplary embodiment of the present invention.

Referring to FIG. 6, a method of manufacturing the LLT/LLZ composite 140 by the CVD (Chemical Vapor Deposition) method is shown, and the LLT core and the LLZ shell structure may be formed by a method of inserting the LLT material into a chamber 170, heating the material, inserting the LLZ precursor to thinly coat the LLT surface by depositing the LLZ precursor, or sintering at a substantially high temperature after the deposition to grow the LLZ.

Figure 7:
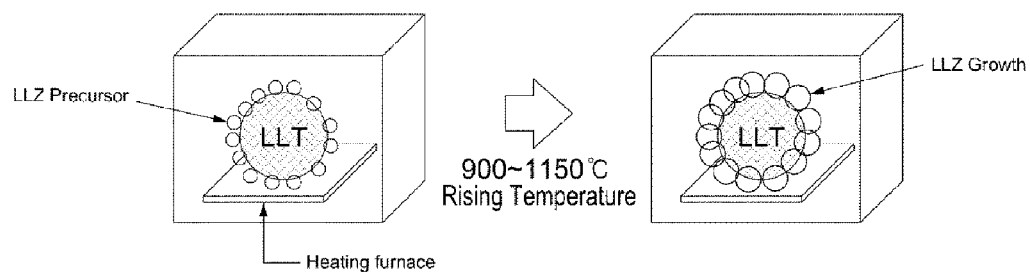

Referring to FIG. 7, a method of manufacturing the LLT/LLZ composite 140 by the temperature difference growth is shown. Generally, the synthesis sintering temperature of the LLZ is about 900~1150° C., and the synthesis sintering temperature of the LLT is about 1350° C., and therefore, there is a difference between the synthesis sintering temperatures of the LLZ and the LLT of about 200~450° C. Accordingly, the LLT/LLZ composite 140 may be manufactured based on the temperature characteristic.

When a LLZ precursor is attached to the surface of the LLT core in a heating furnace and the temperature is increased from room temperature, the LLZ may be synthesized and grown at the temperature range of about 900~1150° C., and the composite may be manufactured by coating the LLT surface with the LLZ by maintaining the temperature of about 900~1150° C. for a predetermined time.

Figure 8:
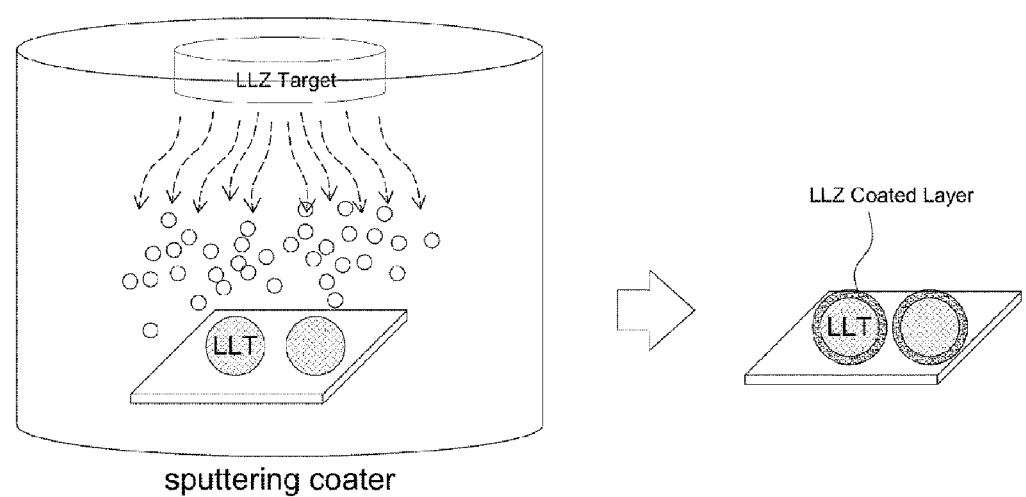

FIG. 8 shows a method of manufacturing the LLT/LLZ composite 140 by the RF sputtering method. Since the RF sputtering method may conduct sputtering using a non-conducting sample as a target, the composite may be manufactured by thinly coating the LLZ as an oxide on the surface of the LLT. In other words, the LLZ may be used as a target material, and the LLT particle may be placed on the substrate to form the coated layer.

Figure 9:
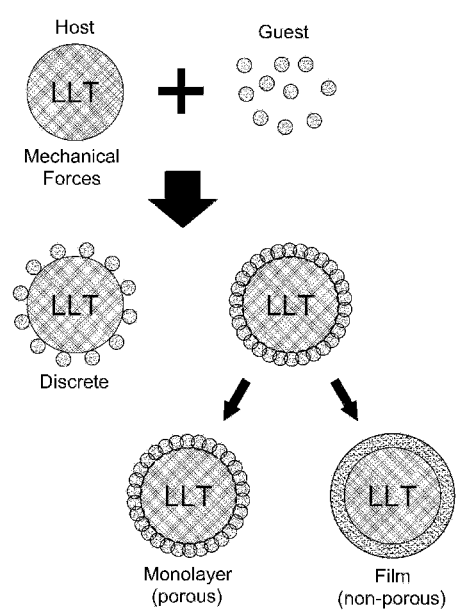

FIG. 9 shows a method of manufacturing the LLT/LLZ composite 140 by the composite powdering method. The composite powdering method is a method of pasting the LLZ particle on the LLT surface using a powder complexation device and using the particle size difference of the LLT and the LLZ by a dry process. In the present invention, the complexation may be conducted using the LLT particle of about 10 nm~10 μm and the LLZ particle of about 1 nm~100 nm by mechanical force, and the larger the size difference between the two particles the more advantageous the complexation is. For example, the composite may be manufactured with the particle size difference of the two materials about 100~1000 times. The powder complexation device may be, for example, Mechanofusion, Hybridizer, Magnetically assisted impaction coater (MAIC) and Rotating fluidized bed coater (RFBC).

As described above, in the present invention, the CVD (Chemical Vapor Deposition) method, the PVD (Physical Vapor Deposition) method, the temperature difference growth method, the composite powdering method or the RF sputtering method may be used to manufacture the LLT/LLZ composite 140, but the present invention is not limited thereto, and the LLT/LLZ composite 140 may be manufactured by any known method similar therewith.

The lithium secondary battery according to the present invention may improve chemical instability of the LLT when contacted with the Li-based metal and improve ionic conductivity by the core-shell structure added with the LLZ or the composite powder structure. Further, the lithium secondary battery according to the present invention, using the LLT-based solid electrolyte, may be used to develop a high energy density battery, to manufacture a battery with various electrode materials due to the chemical stability achieved due to the substantially low reactivity with the electrode interface, and to reduce risk of explosion of the battery by the liquid electrolyte.

The invention has been described in detail with reference to exemplary embodiments thereof. However, it will be appreciated by those skilled in the art that changes or modifications may be made in these embodiments without departing from the principles and spirit of the invention, the scope of which is defined in the accompanying claims and their equivalents.

What is claimed is:

1. A lithium secondary battery, comprising:
a separator formed by an electrolyte between a cathode and an anode,
wherein a composite coated layer of lithium-lanthanum-titanate (LLT) ($Li_xLa_yTiO_3$) and lithium-lanthanum-zirconium-oxide (LLZ) ($Li_7La_3Zr_2O_{12}$) is formed on the interface of the anode and the electrolyte,
wherein the LLT/LLZ composite is formed as a core-shell structure, in which the LLT becomes a core and the LLZ becomes a shell.

2. The lithium secondary battery according to claim 1, wherein the x and y in the LLT ($Li_xLa_yTiO_3$) are about 0.30-0.40 and about 0.50-0.60, respectively.

3. The lithium secondary battery according to claim 1, wherein the LLT/LLZ composite is formed as a structure, in which the LLT becomes a core and the LLZ is adhered to the LLT core in the form of a powder.

4. The lithium secondary battery according to claim 1, wherein the diameter of the LLT is about 10 to 1000 nm, and the thickness of the LLZ is about 1 to 100 nm.

5. The lithium secondary battery according to claim 1, wherein the thickness of the LLT/LLZ composite coated layer is about 0.1 to 1.2 μm.

6. The lithium secondary battery according to claim 1, wherein the LLT/LLZ composite is formed by a method selected from a group consisting of: a CVD (Chemical Vapor Deposition) method, a PVD (Physical Vapor Deposition) method, a temperature difference growth method, a composite powdering method, and a RF (radio frequency) sputtering method.

7. The lithium secondary battery according to claim 1, wherein the electrolyte is formed as a LLT-based solid electrolyte.

8. The lithium secondary battery according to claim 7, wherein the solid electrolyte comprises a LLT/LLZ composite.

9. The lithium secondary battery according to claim 1, wherein the cathode uses a sulfur (S) electrode or a carbon (C) electrode, and the anode is an electrode formed by an active material selected from a group consisting of: Li, $LiCoO_2$, $LiNiO_2$, $LiNiCoO_2$, $LiMn_2O_4$, $V_2O_5$, and $V_6O_{13}$.

* * * * *